June 19, 1945. G. E. DATH 2,378,537
RAILWAY CAR TRUCK
Filed June 28, 1944 2 Sheets-Sheet 1
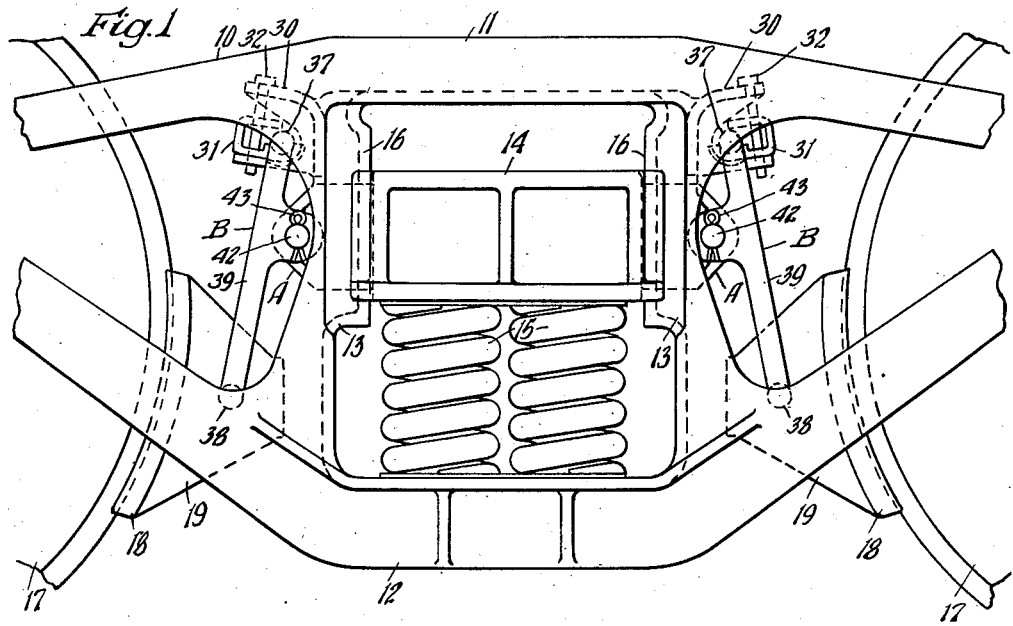
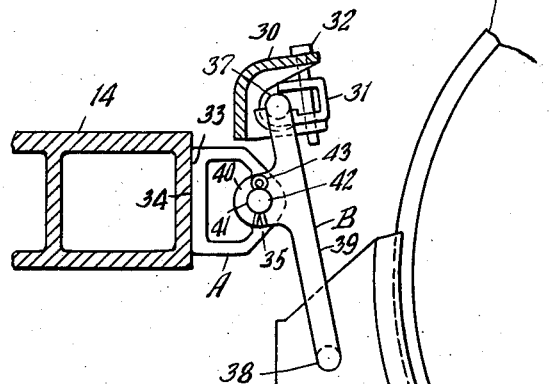
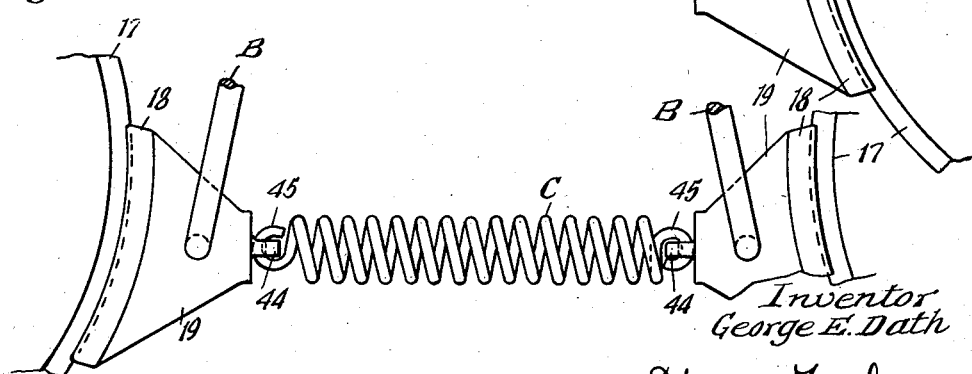
Inventor
George E. Dath
By Henry Fuchs
Atty.

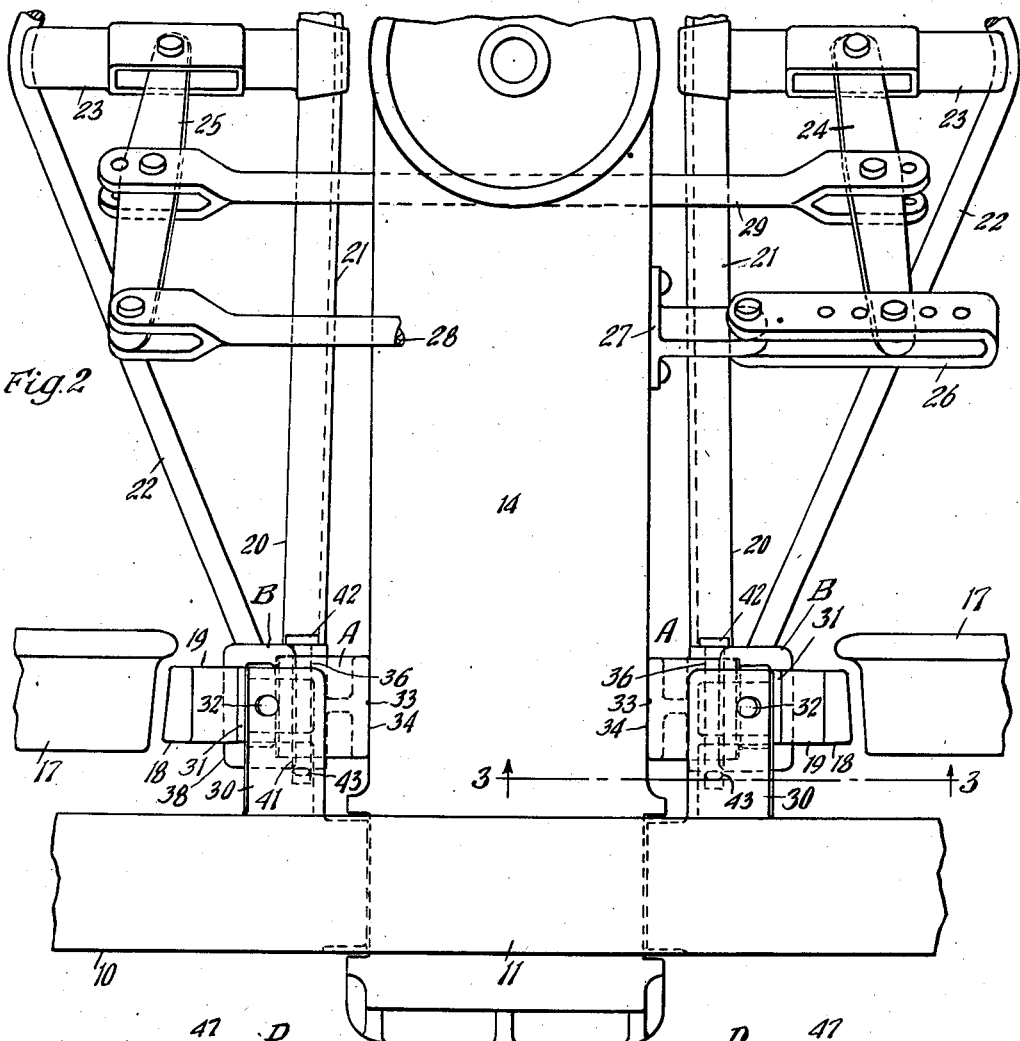
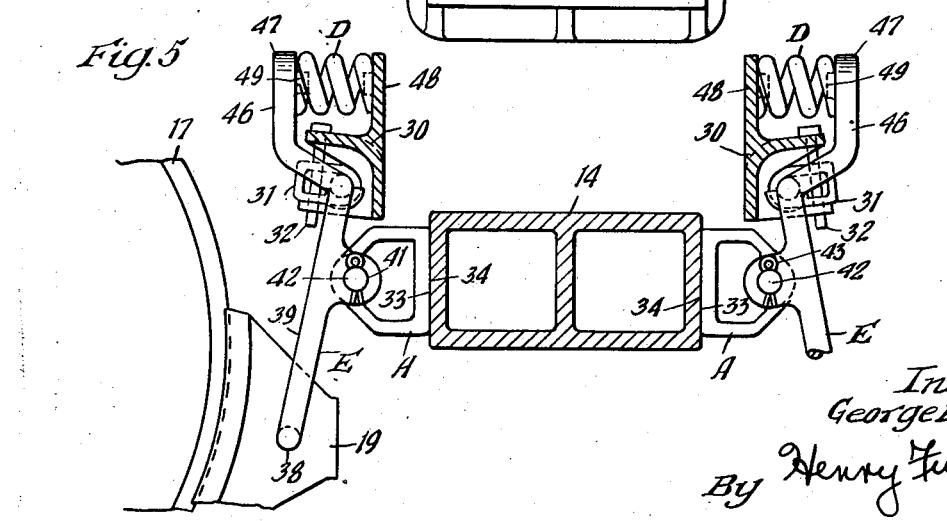

Patented June 19, 1945

2,378,537

UNITED STATES PATENT OFFICE 2,378,537

RAILWAY CAR TRUCK

George E. Dath, Mokena, Ill., assignor to W. H. Miner, Inc., Chicago, Ill., a corporation of Delaware Application June 28, 1944, Serial No. 542,485

9 Claims. (Cl. 188—33)

This invention relates to improvements in railway car trucks.

One object of the invention is to provide in a railway car truck supplemental means for snubbing or dampening the action of the truck springs by frictionally resisting vertical movement of the truck bolster.

A more specific object of the invention is to provide in a railway car truck friction means for resisting vertical movement of the truck bolster to snub the action of the truck springs, wherein the action of the friction means is controlled by the brake mechanism of the car to apply friction to produce the snubbing action when the brakes are in released position.

Other objects of the invention will more clearly appear from the description and claims hereinafter following.

In the drawings forming a part of this specification, Figure 1 is a side elevational view of a portion of the truck of a railway car, illustrating my improvements in connection therewith, said view being partly broken away. Figure 2 is a top plan view of Figure 1, showing the truck structure at one side of the longitudinal center line of the car. Figure 3 is a longitudinal, vertical sectional view, corresponding substantially to the line 3—3 of Figure 2. Figure 4 is a side elevational view, partly broken away, of a portion of the wheels, brake shoes, and brake shoe hangers of the railway car truck shown in Figure 1, illustrating a modified form of my invention. Figure 5 is a longitudinal, vertical sectional view, partly broken away, showing a portion of one of the truck wheels, the cooperating brake shoe, the brake shoe hangers, and the truck bolster of the railway car truck shown in Figure 1, illustrating still another modification of my invention.

In said drawings, 10 indicates one of the side frame members of a railway car truck. The side frame member 10, as shown, is in the form of a casting and has top and bottom members 11 and 12 connected by spaced, vertical sections 13—13, forming guides for the truck bolster. As will be understood by those skilled in this art, the truck includes two side frame members 10—10 and a truck bolster 14. The truck bolster 14 has its opposite ends guided between the vertical sections 13—13 of the truck side frames 10—10 and is supported by the springs 15—15. As most clearly shown in Figure 1, the sections 13—13 are inwardly offset at their upper end portions to provide guides 16—16 which cooperate with guide seats at the sides of the bolster 14. The truck illustrated in the drawings is of the spring plankless type and the truck springs are supported directly on the bottom members 12—12 of the side frames 10—10, the usual top and bottom spring follower plates being interposed between each truck spring cluster in the truck bolster and the bottom member of the side frame.

The truck shown in the drawings has the usual truck wheels, which are indicated by 17, with which brake shoes 18—18 mounted on the brake heads 19—19 cooperate. The brake heads are carried at opposite ends of the usual brake beam 20 comprising compression and tension members 21 and 22. In the present instance, the tension member is in the form of a truss rod. The brake beam also includes the usual strut 23 interposed between the compression member and the truss rod.

As most clearly shown in Figure 2, the brake beams 20—20 are actuated by brake levers 24 and 25 disposed at opposite sides of the truck bolster and having their lower ends pivotally connected to the struts 23—23 of the brake beams. The lever 24 is pivotally suspended at its upper end from the brake hanger 26, which is pivoted to a bracket 27 fixed to the corresponding side of the truck bolster 14. The upper end of the lever 25 is pivotally connected to the actuating rod 28 of the brake rigging of the car.

The levers 24 and 25 are connected by the usual brake lever connecting rod 29 having its opposite ends pivotally connected to the levers 24 and 25 respectively at points intermediate the ends of said levers.

Each side frame member of the truck is provided with brake hanger supporting brackets 30—30 which project from the inner side of the side frame 10 at opposite sides of the truck bolster guide opening and are located above the bolster. These brackets are of the usual well-known design and are provided with wear plates 31—31 secured by keys 32—32.

As is well understood by those skilled in this art, the opposite ends of each brake beam 20 are supported by the usual hangers which are swingingly supported at their upper ends in the brackets 30 and pivotally connected at their lower ends to the brake heads 19—19 of the brake beam.

In carrying out my improvements, as illustrated in Figures 1 to 3 inclusive, I provide friction shoes A—A at the front and rear sides of the truck bolster of each truck of a railway car, having sliding frictional contact with the vertical sides of the bolster, and hangers B—B of special design carrying the shoes A—A.

The friction shoes A are four in number for each truck, being disposed at opposite sides of the truck bolster 14 at each end of the same. Each shoe A is in the form of a block having a vertically disposed, flat friction surface 33 on the inner side thereof engaging the corresponding vertical side face of the body bolster, which side face forms a friction surface, and is indicated by 34. The friction shoe A is provided with an outward projection 35 having a transversely extending pivot pin receiving opening 36.

The hangers B are four in number, two for each brake beam 20 located at opposite ends of the beam. Each hanger B is in the form of a link of rectangular shape, comprising top and bottom transverse end members 37 and 38 and vertical side members 39—39. The hanger B is pivotally supported in the corresponding bearing bracket 30, having the top member 37 thereof journaled in the liner 31. Each hanger B is connected to the corresponding brake head by its bottom member 38, which extends through a suitable opening or bearing seat in the brake head 19. Between the upper and lower ends, each side member 39 of the link forming the hanger B is provided with a laterally extending lug or ear 40, the lugs on the two members 39—39 being in transverse alignment and having horizontally aligned pivot pin receiving openings 41—41.

Each friction block A is pivotally connected to the corresponding hanger B, having the projecting portion 35 of said block embraced between the ears 40—40 of the hanger and secured by a pivot pin 42, extending through the pin receiving openings of said ears and projection. The pin 42 is preferably fixed against removal by a cotter pin 43.

In snubbing the action of the truck springs 15—15 of the railway car truck, the friction shoes A—A frictionally engage opposite sides of the bolster 14, thereby opposing vertical movement of the same, the shoes being pressed against the bolster by operation of the swinging hangers B—B of the brake rigging. When the brakes are applied by operation of the actuating rod 28 of the brake rigging mounted on the truck, the brake shoes will be moved outwardly away from the bolster and toward the wheel 17 of the car, retarding rotation of the wheels. During this action, the hangers B—B are swung outwardly away from the bolster 14 by swinging outward movement of the brake beams 20—20, thereby breaking the contact between the friction shoes A—A and the truck bolster 14. When the brakes are released, the brake shoes are moved out of engagement with the truck wheels, thereby bringing the friction shoes A—A into engagement with the opposite sides of the bolster 14 through swinging movement of the hangers B—B toward the bolster. Thus, when the brakes are in released condition and the railway car is in motion, the friction shoes A—A effectively snub the action of the springs of the railway car truck.

Referring next to the modification of the invention illustrated in Figure 4, the construction is the same as that illustrated in Figures 1, 2, and 3, with the exception that a tension spring C is added for pressing the friction shoes A against the friction surfaces at the vertical sides of the bolster 14. In carrying out the invention illustrated in Figure 4, I provide the brake heads 19—19 with inwardly projecting eye members 44—44 to which the opposite ends of the spring C are anchored, the spring C being in the form of a helical coil having hook-shaped tangs 45—45 at opposite ends engaged through the eyes 44—44.

The operation of the snubbing means involved in the modification of the invention illustrated in Figure 4 is the same as that of the construction illustrated in Figures 1, 2, and 3, with the exception that when the brakes are released the force of the spring C is added to the force of gravity to swing the hangers B—B inwardly toward each other to provide contact between the friction shoes A—A and the bolster 14.

Referring next to the embodiment of the invention illustrated in Figure 5, the construction is generally also the same as that illustrated in Figures 1, 2, and 3, with the exception that the hangers for the brake heads 19—19 are provided with upstanding lever arms, and springs D—D are added which cooperate with the lever arms to press the friction shoes A—A against the bolster.

In carrying out my invention as illustrated in Figure 5, I provide hangers E—E at the opposite ends of each brake beam 20, which hangers are in all respects similar to the hangers B—B hereinbefore described, with the exception that each hanger E is provided with an upstanding lever arm 46 at the pivotal connection of the hanger with the corresponding supporting bracket 30. The upper end portion of the lever arm 46 is laterally outwardly offset, as indicated at 47, said offset portion 47 extending substantially vertically and being in the form of a flat plate. Each bracket 30 is provided with an upstanding flange 48, which is located at the back of the bracket and forms an abutment for the spring D.

The springs D are four in number for each truck, two of said springs being associated with each side frame of said truck. The springs D—D of each side frame are disposed at opposite sides of the bolster 14 and each spring D is interposed between the spring abutment 48 at the corresponding side of the bolster and the lever arm 46 of the hanger E. The springs D are preferably under initial compression and are centered by suitable bosses 49—49 on the levers 46—46 and the abutments 48—48.

The operation of the snubbing arrangement shown in Figure 5 is substantially the same as that described in connection with the snubbing arrangement shown in Figures 1, 2, and 3, with the exception that the force of the springs D—D is added to press the friction shoes A—A against the friction surfaces of the truck bolster 14.

I have herein shown and described what I now consider the preferred manner of carrying out my invention, but the same is merely illustrative and I contemplate all changes and modifications that come within the scope of the claims appended hereto.

I claim:

1. In a railway car truck including truck side frames at opposite sides of the truck, the combination with a vertically movable truck bolster guided in said side frames; of springs supporting said bolster at opposite ends on the side frames; a brake beam extending transversely of the truck and laterally movable toward and away from the bolster; and a friction shoe actuated by movement of said brake beam toward the bolster to frictionally engage the bolster and resist vertical movement thereof.

2. In a railway car truck including truck side frames at opposite sides of the truck, the combination with a vertically movable truck bolster guided in said side frames; of springs supporting said bolster at opposite ends on said side frames respectively; a brake beam extending transversely of the truck; swinging hangers supporting said brake beam at opposite ends for movement toward and away from said bolster; and a friction shoe secured to each hanger and movable therewith toward the bolster to engage the latter and frictionally resist vertical movement of the bolster to snub the action of the truck springs.

3. In a railway car including a brake rigging and a truck having wheels and side frame members, the combination with a truck bolster vertically movable in said truck side frame members; of springs supporting the bolster on said side frame members; a member forming a part of the brake rigging of the car, said member being moved toward the bolster when the brakes are released; and friction shoes engageable with the bolster to resist vertical movement thereof, said shoes being moved against the bolster by said member upon release of the brakes.

4. In a railway car truck including truck side frames at opposite sides of the truck, a vertically movable truck bolster guided in said side frames, clusters of springs supporting said bolster at opposite ends on the side frames, and a brake beam extending transversely of the truck and having brake heads at opposite ends thereof, the combination with a friction shoe having a friction surface in sliding frictional contact with the side of said bolster; of a hanger pivoted at its upper end to one of said side frames and at its lower end to the brake head at the corresponding end of said brake beam, said shoe being pivotally supported on said hanger below the pivotal connection of said hanger with said side frame.

5. In a railway car truck including truck side frames at opposite sides of the truck, a truck bolster guided at opposite ends for vertical movement in said side frames, a cluster of springs at each end of said bolster supporting the same on said side frames respectively, and a pair of brake beams at opposite sides of said bolster, each having brake heads at opposite ends, the combination with a pair of hanger members at opposite sides of the bolster at each end of the same, each hanger being pivotally hung on the corresponding side frame and pivotally connected at its lower end to the brake head at the end of the corresponding brake beam; of a friction shoe pivotally supported on each hanger below the pivotal connection thereof with the side frame and above the pivotal connection thereof with the brake beam, each shoe having a friction surface engaging the corresponding vertical side face of the bolster.

6. In a railway car truck including truck side frames at opposite sides of the truck, a vertically movable truck bolster guided in said side frames, clusters of springs supporting said bolster at opposite ends on the side frames, and a brake beam extending transversely of the truck and having brake heads at opposite ends thereof, the combination with a friction shoe having a friction surface in sliding frictional contact with the side of said bolster; of a hanger pivoted at its upper end to one of said side frames and at its lower end to the brake head at the corresponding end of said brake beam, said shoe being pivotally supported on said hanger below the pivotal connection of said hanger with said side frame; and spring means yieldingly forcing said hanger toward the bolster to press the friction shoe into tight frictional engagement therewith.

7. In a railway car truck including truck side frames at opposite sides of the truck, a truck bolster guided at opposite ends for vertical movement in said side frames, a cluster of springs at each end of said bolster supporting the same on said side frames respectively, and a pair of brake beams at opposite sides of said bolster, each having brake heads at opposite ends, the combination with a pair of hanger members at opposite sides of the bolster at each end of the same, each hanger being pivotally hung on the corresponding side frame and pivotally connected at its lower end to the brake head at the end of the corresponding brake beam; of a friction shoe pivotally supported on each hanger below the pivotal connection thereof with the side frame and above the pivotal connection thereof with the brake beam, each shoe having a friction surface engaging the corresponding vertical side face of the bolster; and spring means yieldingly forcing said hanger toward the bolster to press the friction shoes into tight frictional engagement therewith.

8. In a railway car truck including truck side frames at opposite sides of the truck, a truck bolster guided at opposite ends for vertical movement in said side frames, a cluster of springs at each end of said bolster supporting the same on said side frames respectively, and a pair of brake beams at opposite sides of said bolster, each having brake heads at opposite ends, the combination with a pair of hanger members at opposite sides of the bolster at each end of the same, each hanger being pivotally hung on the corresponding side frame and pivotally connected at its lower end to the brake head at the end of the corresponding brake beam; of a friction shoe pivotally supported on each hanger below the pivotal connection thereof with the side frame and above the pivotal connection thereof with the brake beam, each shoe having a friction surface engaging the corresponding vertical side face of the bolster; and a tension spring connecting the lower ends of each pair of hangers for swinging said hangers toward the bolster to press the friction shoes against the latter.

9. In a railway car truck including truck side frames at opposite sides of the truck, a vertically movable truck bolster guided in said side frames, clusters of springs supporting said bolster at opposite ends on the side frames, and a brake beam extending transversely of the truck and having brake heads at opposite ends thereof, the combination with a friction shoe in sliding frictional contact with the side of said bolster; of a hanger pivoted on the corresponding side frame above said bolster, said hanger having an upwardly extending lever arm thereon, said hanger being pivotally connected at its lower end to the brake head at the corresponding end of said brake beam, said shoe being pivotally connected to said hanger between the pivotal connection thereof with the side frame and the brake head; and a spring buttressed against said side frame and bearing on the lever arm of said hanger to swing the hanger toward the bolster and press the friction shoe into tight frictional engagement with said bolster.

GEORGE E. DATH.